March 5, 1929.  E. L. DAY  1,703,991
FLYWHEEL
Filed July 3, 1926
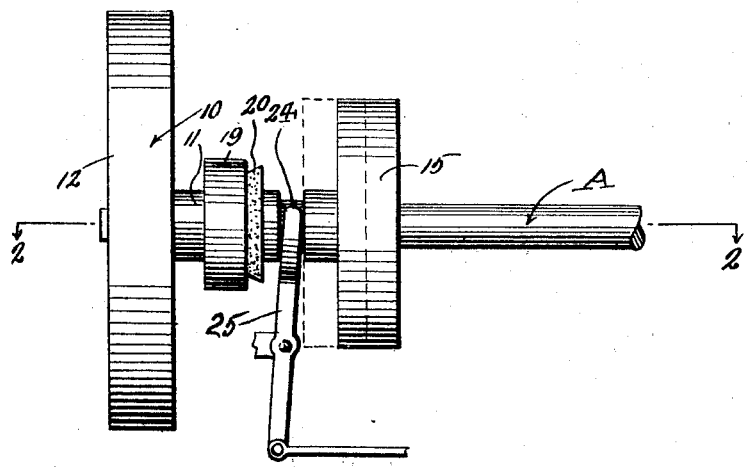
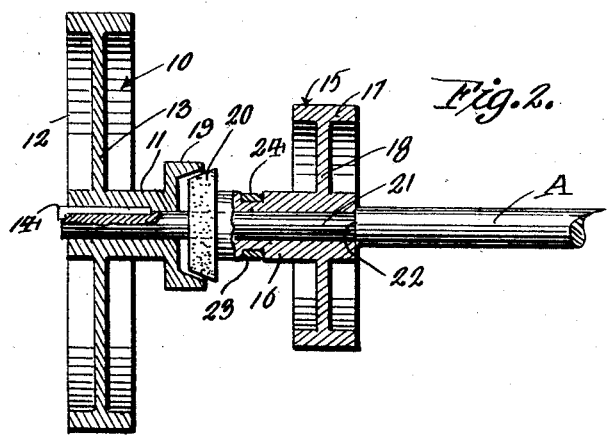
WITNESSES
Inventor
EDMUND L. DAY
By Richard B. Owen
Attorney Patented Mar. 5, 1929.

1,703,991

UNITED STATES PATENT OFFICE.

EDMUND L. DAY, OF SANFORD, FLORIDA.

FLYWHEEL.

Application filed July 3, 1926. Serial No. 120,471.

This invention appertains to novel appliances for drive shafts and more particularly to a novel arrangement of fly wheels thereon.

The primary object of the present invention is to provide a pair of independent fly wheels upon the drive shaft of a motor, the combined weight of the wheels being equal to the normal weight of the single fly wheel generally used in conjunction therewith, one of said fly wheels being keyed to the drive shaft with means whereby the other wheel can be connected with the first mentioned fly wheel and shaft for synchronous rotation therewith, the novel arrangement facilitating the easy starting of the engine and the gradual assuming of the load of the fly wheels by the drive shaft and engine.

A further object of the invention is the provision of novel means for connecting the independent fly wheels together for synchronous movement, whereby the wheels can be set at the desired positions in an expeditious and convenient manner.

A still further object of the invention is to provide a novel arrangement of fly wheels and a drive shaft of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings; in which drawings:

Figure 1 is a side elevation of one form of my invention,

Figure 2 is a longitudinal section through the same.

Referring to the drawings in detail, wherein similar reference characters designate corresponding parts throughout the several views, the letter A generally indicates a drive shaft, which can be considered, in the present instance, as the crank shaft of a drive motor, such as an internal combustion engine. The drive shaft A has arranged thereon fly wheels 10 and 15 and as shown the fly wheel 10 is of a greater size than the fly wheel 15, although these wheels can be of the same or varying sizes without departing from the spirit or the scope of this invention. It is preferred however that the combined weight of the fly wheels will be the same as the weight of the ordinary fly wheel used in a drive shaft of a particular type of engine. The fly wheel 10 embodies an elongated hub 11, the weighted rim 12, and the connecting body or spoke 13. As shown, the hub 11 is rigidly connected with the drive shaft A for rotation therewith by means of a key 14, but it is to be understood that the wheel can be connected to the shaft for movement therewith in any other preferred way. The fly wheel 15 is of substantially the same construction as the wheel 10 and also embodies an elongated hub 16, the weighted rim 17 and the connecting spokes or body 18. It is to be noted that the hubs 11 and 16 of the wheels 10 and 15 project inwardly toward one another and that the same are provided with mated clutch faces 19 and 20 respectively. The fly wheel 15 is rotatably mounted upon the drive shaft A and can be held against sliding movement in one direction in any preferred way, such as by a suitable collar. As shown one end of the shaft A is reduced in diameter as at 21 to provide a stop shoulder 22 against which the wheel 15 normally rests. In order to bring about the sliding movement of the fly wheel 15 on the shaft A, in accordance with this invention, the elongated hub sleeve 16 is provided with an annular groove 23 in which is normally fitted a yoke 24 of a clutch shifting lever 25, which can be operated in any desired way.

In use of the invention, the motor is started in the usual way with the fly wheel 15 disconnected from the fly wheel 10. Owing to the fact that the fly wheel 10 is of a less weight than the ordinary wheel, the starting of the motor will be gradual and will be considerably facilitated. As the motor gains in speed, the lever 25 is operated for moving the clutch 20 in engagement with the clutch 19, whereby the wheels 10 and 15 will rotate in unison. The combined effect of a fly wheel of full weight is now obtained.

This invention has proven especially advantageous in marine motors, but also can be used on automobiles, aircraft and the like.

Changes in details may be made without departing from the spirit or the scope of this invention, but what I claim as new is:

The combination with a shaft, a fly wheel including an elongated hub sleeve secured to the shaft, a clutch section carried by the inner end of the sleeve, a second fly wheel rotatably and slidably mounted on the shaft including an elongated hub sleeve extending toward the hub sleeve of the first mentioned fly wheel, a clutch section carried by the inner end of the hub sleeve of the second mentioned fly wheel, and manual means for sliding the last mentioned fly wheel toward the first mentioned fly wheel to connect the same together for synchronous rotation.

In testimony whereof I affix my signature.

EDMUND L. DAY.